(12) United States Patent
Beran et al.

(10) Patent No.: US 7,584,416 B2
(45) Date of Patent: Sep. 1, 2009

(54) LOGICAL REPRESENTATION OF A USER INTERFACE FORM

(75) Inventors: Eric B. Beran, Birkeroed (DK); Jens Moller-Pedersen, Allerod (DK); Peter Sloth, Copenhagen (DK); Uffe Kjall, Vaerloese (DK)

(73) Assignee: Microsoft Corporation, Redmond, WA (US)

( * ) Notice: Subject to any disclaimer, the term of this patent is extended or adjusted under 35 U.S.C. 154(b) by 327 days.

(21) Appl. No.: 11/358,492

(22) Filed: Feb. 21, 2006

(65) Prior Publication Data

US 2007/0198940 A1    Aug. 23, 2007

(51) Int. Cl.
G06F 17/00 (2006.01)
(52) U.S. Cl. .................. 715/222; 715/221; 715/223; 715/224; 715/225; 715/238; 715/762; 707/1
(58) Field of Classification Search .............. 715/212, 715/221–225, 238, 762; 707/1–10
See application file for complete search history.

(56) References Cited

U.S. PATENT DOCUMENTS

| | | | |
|---|---|---|---|
| 5,999,948 A * | 12/1999 | Nelson et al. ............... 715/207 |
| 6,256,678 B1 * | 7/2001 | Traughber et al. .......... 719/310 |
| 6,598,093 B1 * | 7/2003 | Schmidt et al. ............. 719/328 |
| 2002/0026461 A1 * | 2/2002 | Kutay et al. ................. 707/523 |
| 2003/0084120 A1 * | 5/2003 | Egli ............................ 709/218 |
| 2003/0167355 A1 * | 9/2003 | Smith et al. ................. 709/328 |
| 2003/0221165 A1 * | 11/2003 | Young et al. ................ 715/505 |
| 2006/0004845 A1 * | 1/2006 | Kristiansen et al. ..... 707/103 R |
| 2006/0136830 A1 * | 6/2006 | Martlage et al. ........... 715/745 |
| 2007/0100967 A1 * | 5/2007 | Smith et al. ................. 709/219 |

* cited by examiner

*Primary Examiner*—Stephen S Hong
*Assistant Examiner*—David Faber
(74) *Attorney, Agent, or Firm*—Leanne Taveggia Farrell; Westman, Champlin & Kelly, P.A.

(57) ABSTRACT

User interface (UI) forms are rendered on different types of display targets. To generate a UI form that can be rendered on different types of display targets metadata stored in at least one application is transformed to build a logical user interface (UI) representation. The UI form is rendered on at least one of the different types of display targets based on the logical UI representation. Data and form layout from the at least one application is accessed for representation in the logical UI representation. The rendered UI form is populated with the data represented in the logical UI representation to provide content for the rendered UI form.

18 Claims, 7 Drawing Sheets

LOGICAL REPRESENTATION OF A USER INTERFACE FORM

BACKGROUND

Enterprise resource planning (ERP) and customer relationship management (CRM) are phrases used to describe a broad set of activities supported by multi-module application software that helps a company or merchant manage the important parts of its business. Computerized ERP or CRM systems typically handle the logistics of various activity modules internal to a business or organization, such as accounting/financial management, customer relations management, supply chain management and human resource management. Example ERP system and CRM system software packages include Microsoft® Dynamics™ AX, Microsoft® Dynamics™ GP, Microsoft® Dynamics™ NAV, Microsoft® Dynamics™ SL and Microsoft® Dynamics™ CRM.

ERP and CRM systems utilize a large number of files that are part of a collection of information, generally in tabular form, that are stored in a database shared by various management application modules in each system. On top of these large number of files exists business logic that can change the structure and behavior of the data. Both the tabular form of data and structure presented by the business logic can be considered the data source for each ERP or CRM system. In addition to a data source existing in an ERP or CRM system, a data source can exist within a web service that exposes data in one way or another. These files represent widely varying types of information, for example, including information related to transactions such as sales orders, purchase orders, bill payments and information related to customers and vendors.

In ERP systems, CRM systems and other forms based applications, a large number of forms or form user interfaces are used to view information in the data source as well as used for entering information into a database. A form is a type of user interface (UI) element for viewing data and/or entering data. A UI form is physically represented on a display target. If an ERP or CRM system is connected to a conventional Windows display target, then example forms that would need to be constructed by a developer include Window forms. If an ERP or CRM system is connected to an Internet browser display target, then example forms that would need to be constructed by a developer include web forms or web element forms.

Many ERP and CRM systems include the use of the classic Windows UI accompanied by the Internet browser UI. In this case, a developer constructs a UI form for each type of display target and each type of data source. In the near future, personal digital assistants (PDAs), cell phones and other portable and non-portable UI technologies will accompany the use of the Windows UI and the Internet browser UI. The addition of new UI technologies will add to the complexity and amount of forms that need to be constructed by a developer. In addition, typically, data sources each have their own approach to constructing UI forms.

The discussion above is merely provided for general background information and is not intended to be used as an aid in determining the scope of the claimed subject matter.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

During design-time, a developer creates a logical client or logical model that describes how data structures are transformed for use in making UI forms. The logical client can be modeled based on a plurality of different applications and can allow the rendering of UI forms on a plurality of different display targets. The logical client includes at least a session module and a builder module. During run-time, the builder builds a logical UI representation that can be used to render a UI form on different types of display targets. To render a UI form, one of the display target initiates a session provided by the session module. The session validates the user's credentials and instantiates one of the plurality of builder instances of the builder module that corresponds with metadata for a type of UI form. The builder instance reads and transforms metadata from a application source. The builder instance builds a logical UI representation that includes content pertaining to logical forms, controls, actions and databinders. The content of the logical UI representation, is independent of the source of data and independent of the display target which it will be rendered. Content of the logical UI representation is exposed to at least one display target for rendering of a UI form. The display target renders the UI form in accordance a type of the display target.

DETAILED DESCRIPTION

The following description of illustrative embodiments is described in the context of forms based business applications, such as client applications, client-server applications and various types of multi-tier applications. However, the description of illustrative embodiments can also be used in other types of form-based applications. A common type of business application includes an Enterprise Resource Planning (ERP) system or Customer Relationship Management (CRM) system that can manage many different business modules of a company or a merchant. These form based applications include forms constructed by a developer that are to be rendered by a display target. A form is a window, dialog, page or other type of user interface (UI) element for viewing and/or entering information. A display target renders a physical representation of a UI form. Example display targets that can render a form include each rendering technology on the multiple types of current and future operating systems, such as Windows, the rendering technology of an Internet browser, as well as each rendering technology on the many available or future mobile devices, such as personal digital assistants and cell phones.

Before describing aspects of the illustrated embodiments, however, it may be useful to describe suitable computing environments that can incorporate and benefit from these aspects. ERP and CRM systems are typically implemented in a networked environment of server computers and/or other computers. The computing environment shown in FIG. 1 is one such example.

Figure 1:
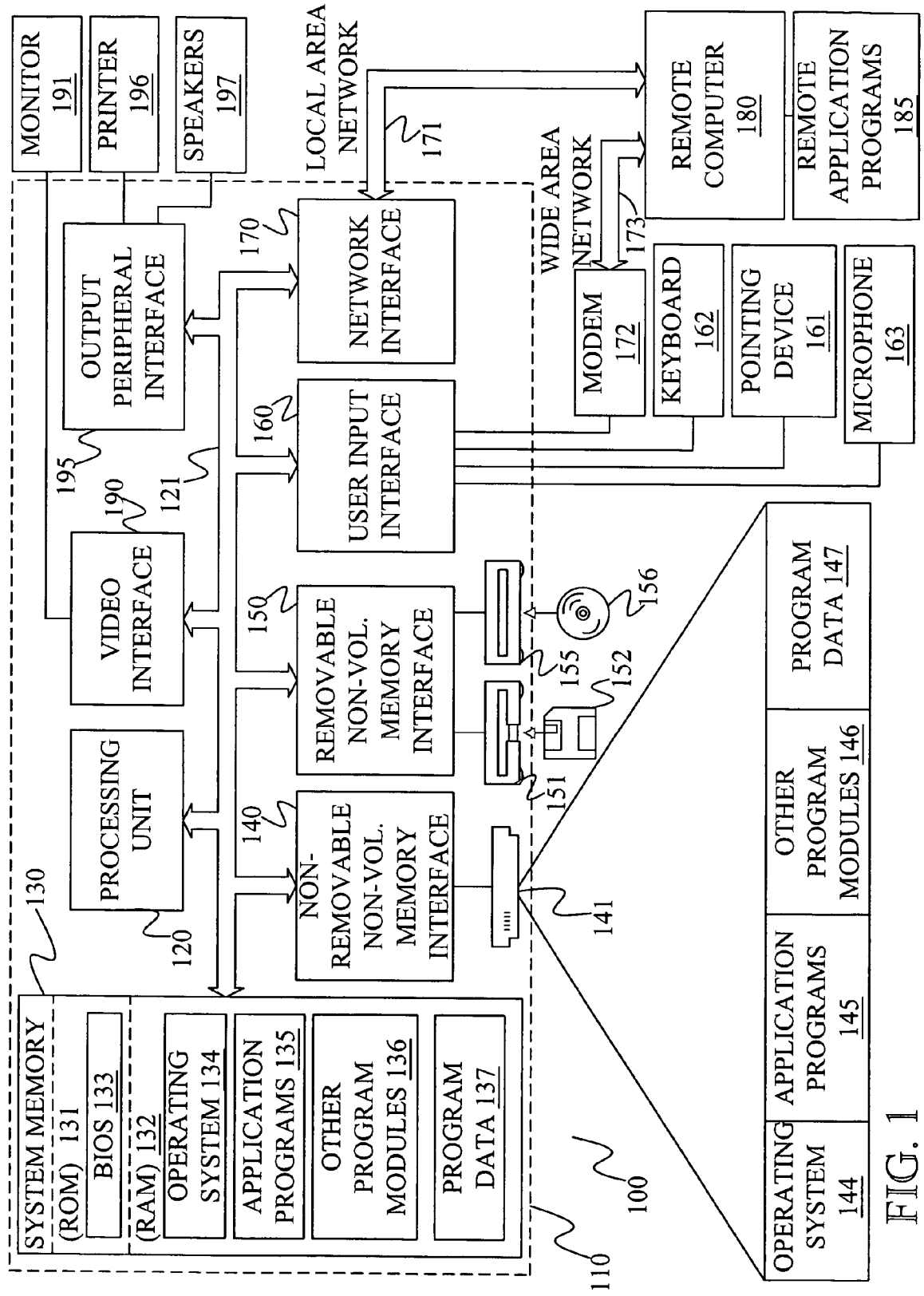
FIG. 1 illustrates a block diagram of a general computing environment in which some embodiments may be practiced.

FIG. 1 illustrates an example of a suitable computing system environment 100 on which embodiments may be implemented. The computing system environment 100 is only one example of a suitable computing environment and is not intended to suggest any limitation as to the scope of use or functionality of the claimed subject matter. Neither should the computing environment 100 be interpreted as having any dependency or requirement relating to any one or combination of components illustrated in the exemplary operating environment 100.

Embodiments are operational with numerous other general purpose or special purpose computing system environments or configurations. Examples of well-known computing systems, environments, and/or configurations that may be suitable for use with various embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Embodiments may be described in the general context of computer-executable instructions, such as program modules, being executed by a computer. Generally, program modules include routines, programs, objects, components, data structures, etc. that perform particular tasks or implement particular abstract data types. Some embodiments are designed to be practiced in distributed computing environments where tasks are performed by remote processing devices that are linked through a communications network. In a distributed computing environment, program modules are located in both local and remote computer storage media including memory storage devices.

With reference to FIG. 1, an exemplary system for implementing some embodiments includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
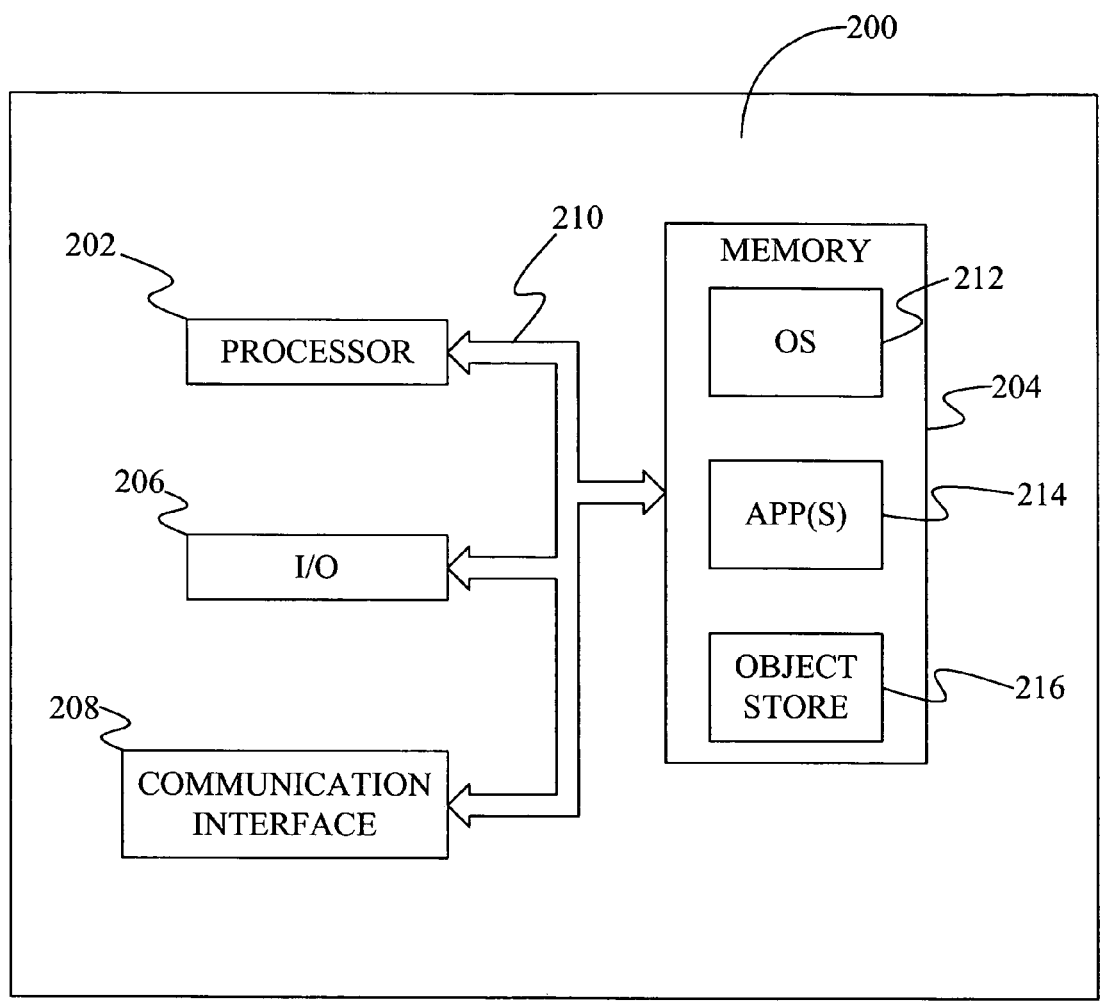
FIG. 2 illustrates a block diagram of a mobile device computing environment in which some embodiments may be practiced.

FIG. 2 is a block diagram of a mobile device 200, which is another exemplary computing environment. Mobile device 200 includes a microprocessor 202, memory 204, input/output (I/O) components 206, and a communication interface 208 for communicating with remote computers or other mobile devices. In one embodiment, the afore-mentioned components are coupled for communication with one another over a suitable bus 210.

Memory 204 is implemented as non-volatile electronic memory such as random access memory (RAM) with a battery back-up module (not shown) such that information stored in memory 204 is not lost when the general power to mobile device 200 is shut down. A portion of memory 204 is preferably allocated as addressable memory for program execution, while another portion of memory 204 is preferably used for storage, such as to simulate storage on a disk drive.

Memory 204 includes an operating system 212, application programs 214 as well as an object store 216. During operation, operating system 212 is preferably executed by processor 202 from memory 204. Operating system 212, in one preferred embodiment, is a WINDOWS® CE brand operating system commercially available from Microsoft Corporation. Operating system 212 is preferably designed for mobile devices, and implements database features that can be utilized by applications 214 through a set of exposed application programming interfaces and methods. The objects in object store 216 are maintained by applications 214 and operating system 212, at least partially in response to calls to the exposed application programming interfaces and methods.

Communication interface 208 represents numerous devices and technologies that allow mobile device 200 to send and receive information. The devices include wired and wireless modems, satellite receivers and broadcast tuners to name a few. Mobile device 200 can also be directly connected to a computer to exchange data therewith. In such cases, communication interface 208 can be an infrared transceiver or a serial or parallel communication connection, all of which are capable of transmitting streaming information.

Input/output components 206 include a variety of input devices such as a touch-sensitive screen, buttons, rollers, and a microphone as well as a variety of output devices including an audio generator, a vibrating device, and a display. The devices listed above are by way of example and need not all be present on mobile device 200. In addition, other input/output devices may be attached to or found with mobile device 200.

Figure 3:
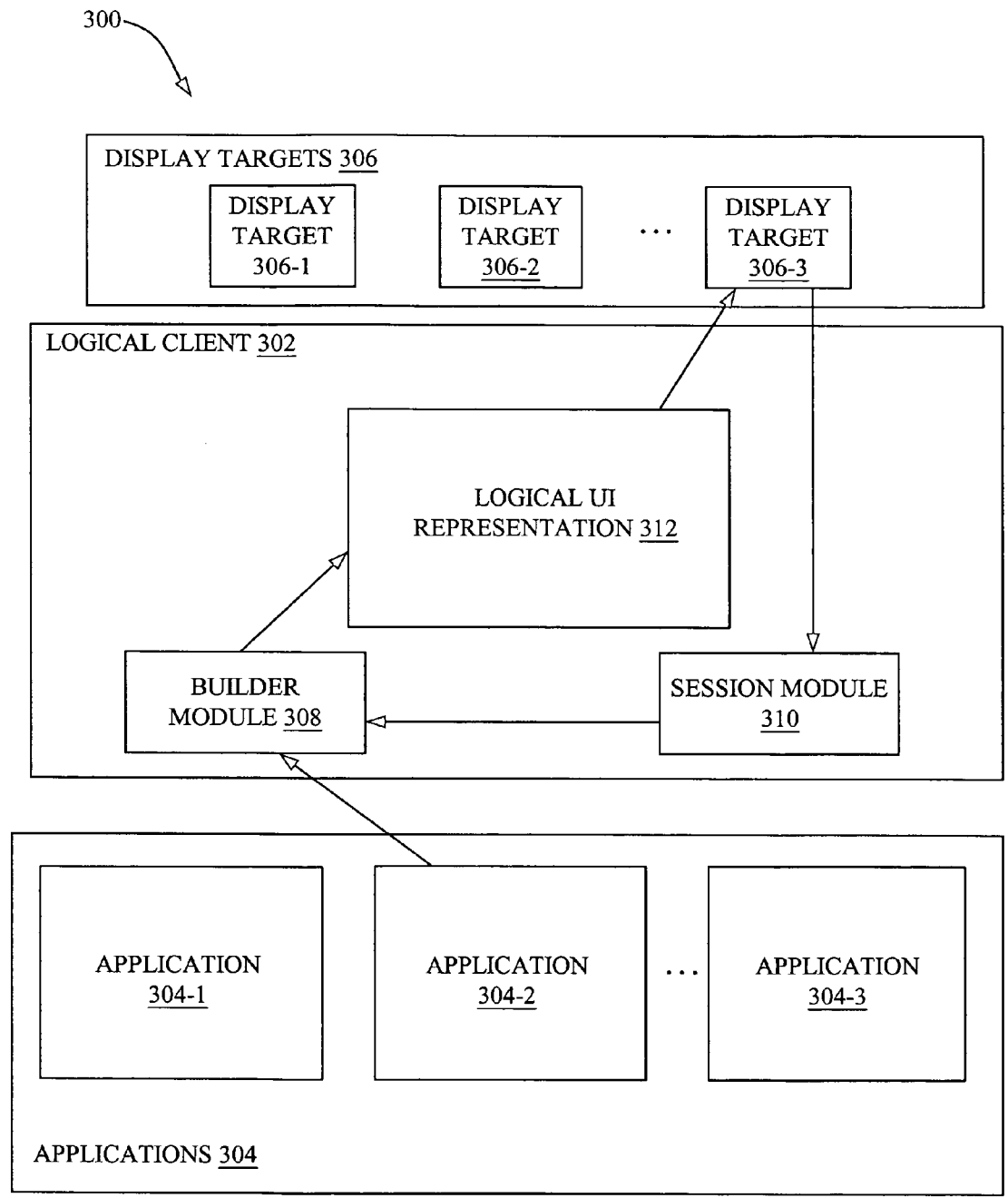
FIG. 3 illustrates a simplified block diagram of a system for generating a user interface (UI) form.

FIG. 3 illustrates a simplified block diagram of a system 300 illustrating basic components of the embodiments that will be described in detail below. The system 300 includes a logical client 302. Logical client 302 is created during design-time and describes or models how data structures are transformed for use in making a UI form. Logical client 302 can be modeled based on data structures in a plurality of different applications 304 (e.g. applications 304-1, 304-2, 304-3) and can be used to render a UI form on a plurality of different display targets 306 (e.g. display targets 306-1, 306-2, 306-3). Examples of applications 304 include business applications, such as ERP systems and CRM systems that store different types of data. The different types of display targets 306 are configured to capture logical content generated by logical client 302 and render its logical content as a UI form. For example, if a display target is an Internet browser, the Internet browser captures the content of logical client 302 and renders the content as a web form. In some cases, the different types of display targets can display only a subset of the logical intent that is included in the logical client.

Logical client 302 includes at least one builder module 308 and a session module 310. During run-time, one of the display targets 306 (display target 306-3 as illustrated in FIG. 3) initiates a session of session module 310. Session module 310 instantiates the at least one builder module 308. Each application 304 is configured to construct their own builders. The at least one builder module 308 is configured to build a logical user interface (UI) representation 312 that captures the logical intent of a UI form. The creation of a logical UI representation 312 allows the underlying logic and content of a UI form to be reused across multiple different display targets 306 while being based on multiple different applications or back-ends 304. In other words, logical UI representation 312 is described in non-specific terms or concepts such that it is not specific to any of the given display targets 306 or any of the given applications 304. In FIG. 3, builder module 308 builds logical UI representation 312 based on application 304-2 and allows display target 306-3 to render the UI form. It should be noted, however, that although logical UI representation 312 is based on application 304-2, logical UI representation 312 is independent of a type of application 304-2. In addition, although logical UI representation allows display target 306-3 to render the UI form, logical UI representation is independent of a type of display target 306-3. Logical UI representation 312 is able to allow the rendering of a UI form on other display targets 306, such as display targets 306-1 and 306-2. A method of rendering a UI form on a display target is described in detail in connection with FIGS. 6 and 7 below.

Figure 4:
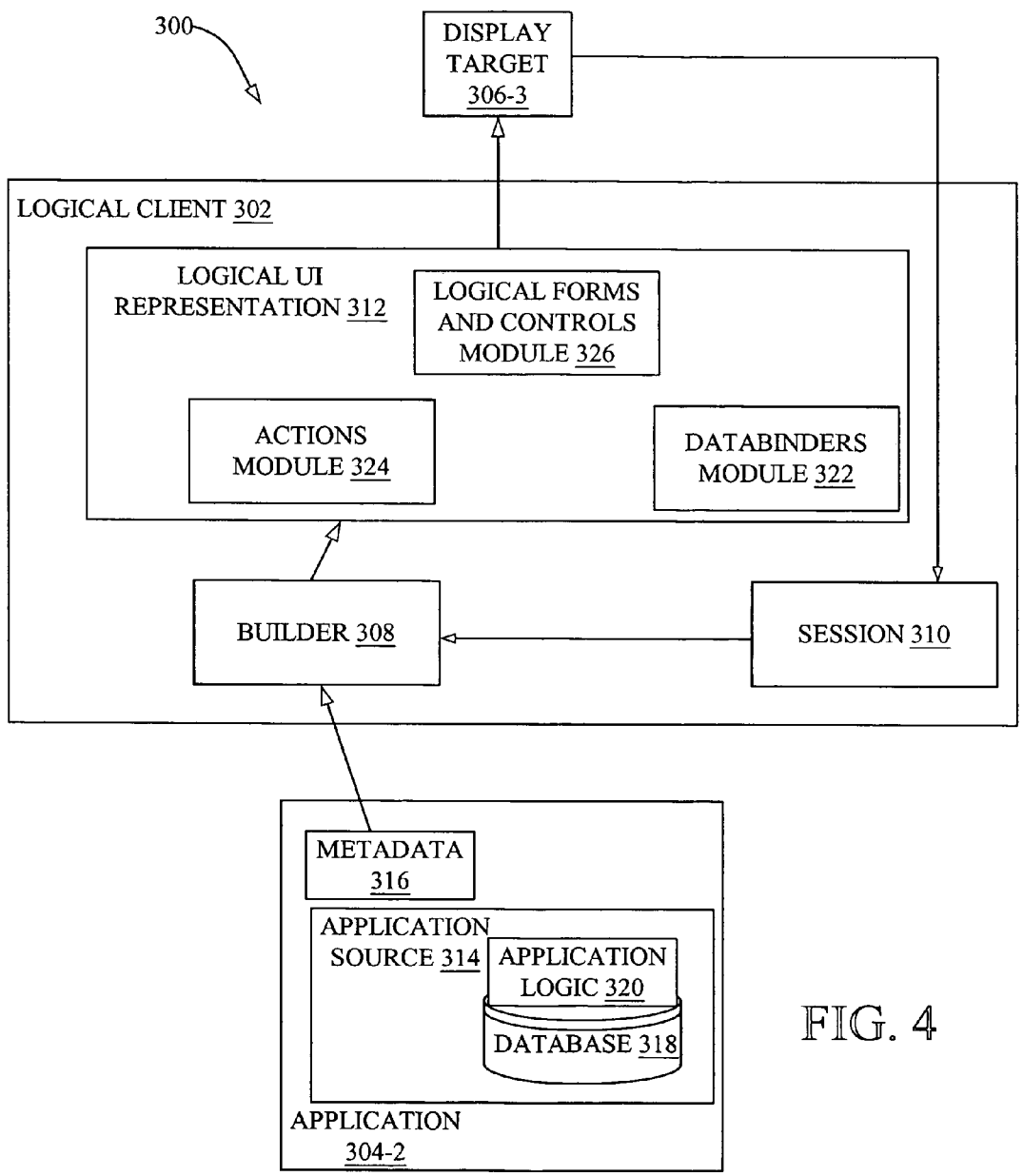
FIG. 4 illustrates a block diagram of the system of FIG. 3 employing a builder to build a logical user interface (UI) representation used for rendering a UI form on a display target.

FIG. 4 illustrates a more detailed block diagram of system 300 of FIG. 3 employing an instance of builder module 308 to build logical user interface (UI) representation 312 for rendering a UI form on display target 306-3. In FIG. 4, application 304-2 includes a application source 314, metadata 316 and an interface (not shown) for reacting to user inputs. It should be understood that each of the plurality of applications 304 of FIG. 3 include both metadata and an application source like application 304-2 illustrated in FIG. 4. Application source 314 includes both application data (i.e. business data) located in a database 318 and application logic 320 (i.e. business logic) built on top of database 318. In some business applications, business data is stored as tables in a database. In other business applications, a web service can expose data to the business application in one way or another. It should be understood that a business application can include many different types of data sources. In the embodiment illustrated in FIG. 4, database 318 includes application data or business data that pertains to customers, vendors, sales transactions and etc. On top of this data is application logic or business logic 320. Application logic 320 interacts with instances of data stored in database 318. Metadata 316 includes information related to the intent of how logical client 302 should build a logical UI representation 312. Metadata 316 can exist explicitly or it can be derived from a data model of application 304-2.

During run-time, session module 310 instantiates the at least one builder module 308. Each application 304 includes the ability to construct their own builders that can understand their own metadata. The at least one builder module 308 constructs logical UI representation 312 in accordance with a computer-implemented method illustrated in a flowchart 400 of FIG. 5. Basically, builder 308 transforms metadata 316 into logical UI representation 312 in accordance with flowchart 400. Builder module 308, constructed by its corresponding application 304-2, reflects over metadata 316 of one of the applications 304 such that builder module 308 can build logical UI representation 312 using information from an application source 308 on how the UI form should be constructed.

Figure 5:
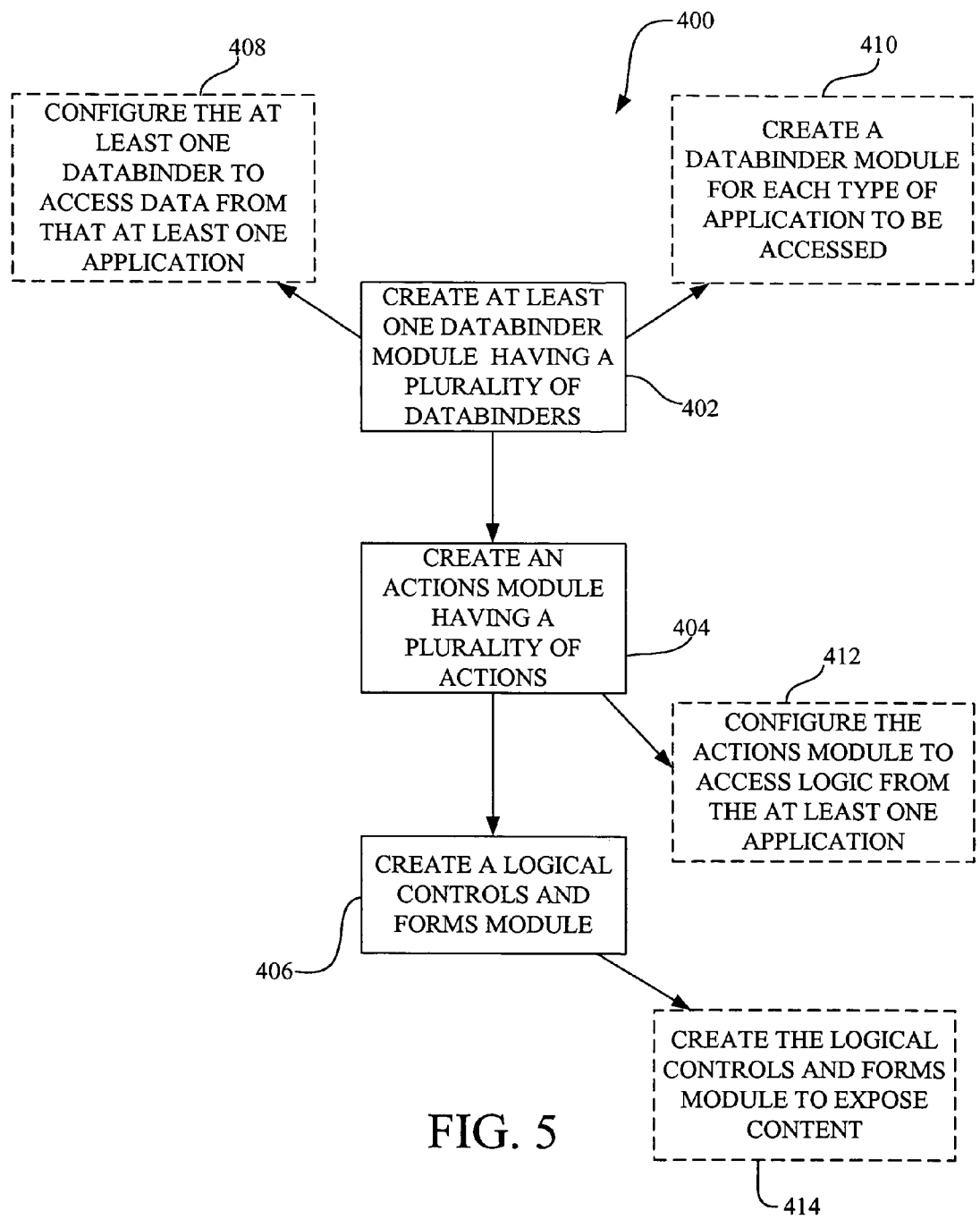
FIG. 5 illustrates flowchart of a computer-implemented method of constructing a logical UI representation.

Referring to both FIGS. 4 and 5, at least one databinder module 322 having a plurality of databinders is created at block 402. The created databinder is generally specialized to bind to the data in a corresponding application 304-2. Although FIG. 4 illustrates a single databinder module 322, it should be understood that builder 308 can create more than one databinder module 322 for logical UI representation 312. In general, a databinder module 322 can be created for each type of application 304-2 that information is being obtained. This step is illustrated at block 410. In FIG. 4, databinder module 322 is configured to represent data from database 318 of application 304-2. Although the data represented in databinder module 322 is based on database 318, data represented in databinder module 322 is independent of a type of application 304-2.

At block 404, an actions module 324 having a plurality of actions is created. Actions module 324 is configured to represent operations available to a user from application 304-2. Although operations represented in actions module 324 are mostly based on application logic 320 in application 304-2, operations represented in actions module 324 are independent of the type of application 304-2. Both databinder module 322 and actions module 324 can be considered to be in a layer of logical UI representation 312 in connection with applications 304 because their content depends on the underlying application 304-2.

At block 406, a logical forms and control module 326 is created. Logical forms and controls module 326 represents an interface between at least one display target 306-3 and databinder module 322 and actions module 324. It should be noted that logical forms and controls module 326 can represent an interface between other display targets 306 and databinder module 322 and actions module 324. Logical forms and controls module 326 handles user interaction from display target 306-3 as well as supplies state events from logical forms and controls module 326 to display target 306-3 for use rendering a UI form to a user. Logical forms and controls module 326 can be considered to be in a layer of logical UI representation 312 in connection with display targets 306 because the rendering of UI forms on display targets 306 is based on the underlying logical forms and controls module 326.

At block 408, the at least one databinder module 322 is configured to access data from the at least one application 304-2. Databinder module 322 accesses data in application source 314, such as in database 318. Databinder module 322 represents the data in application source 314 as a data structure that is independent of a type of application 304-2. The data structure expresses data in terms of how data should be displayed in a UI form. At block 412, the actions module 324 is configured to access logic from the at least one application 304-2. Actions module 324 accesses logic in application logic 320 of application source 314. Actions module 324 represents and includes operations available to a user for performing on the data structure represented by databinder module 322. At block 414, logical forms and controls module 326 are created for use in exposing content of logical UI representation 312 to the at least one display target 306.

Figure 6:
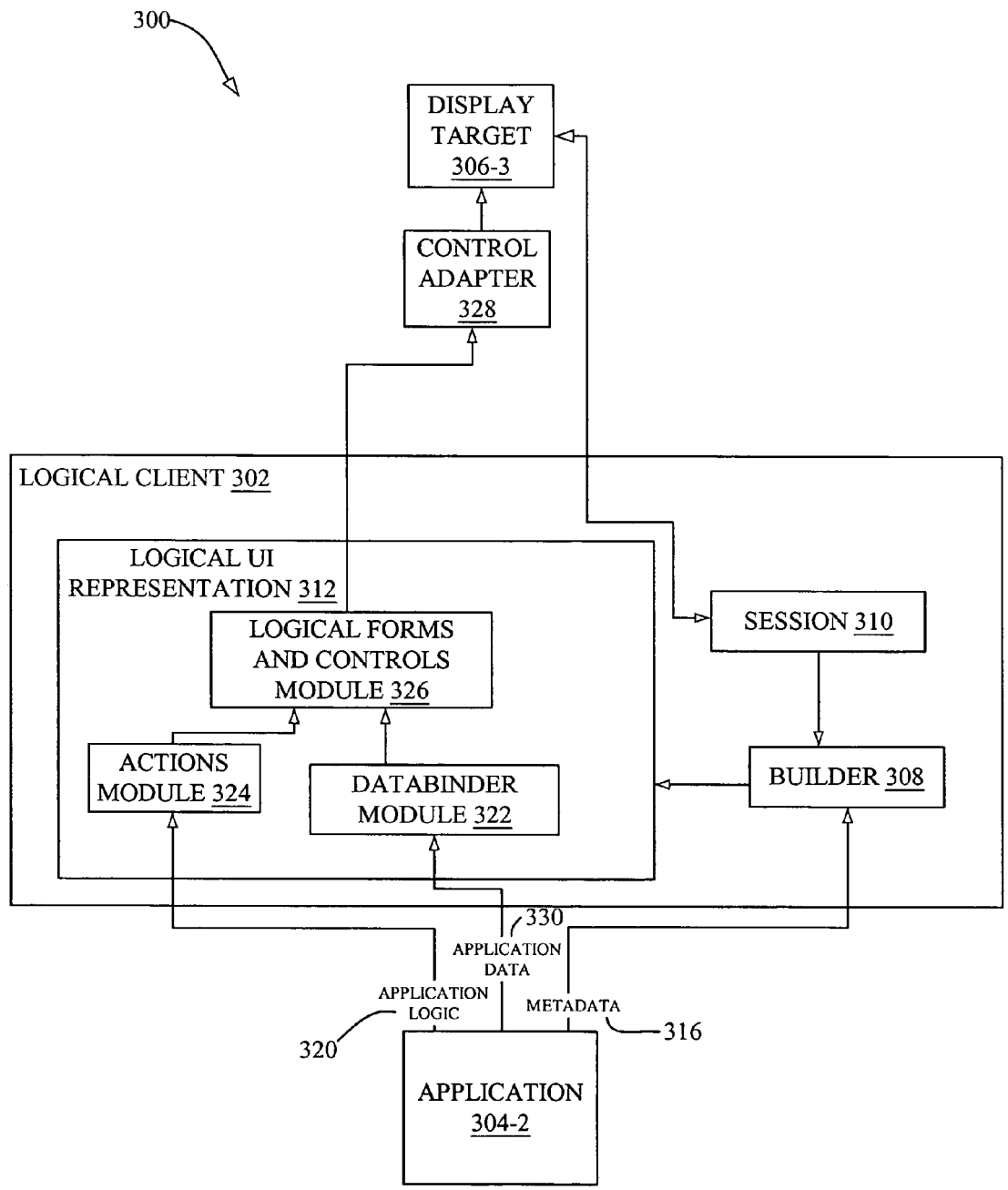
FIG. 6 illustrates a more detailed block diagram of the system of FIG. 3 for generating a UI form.
Figure 7:
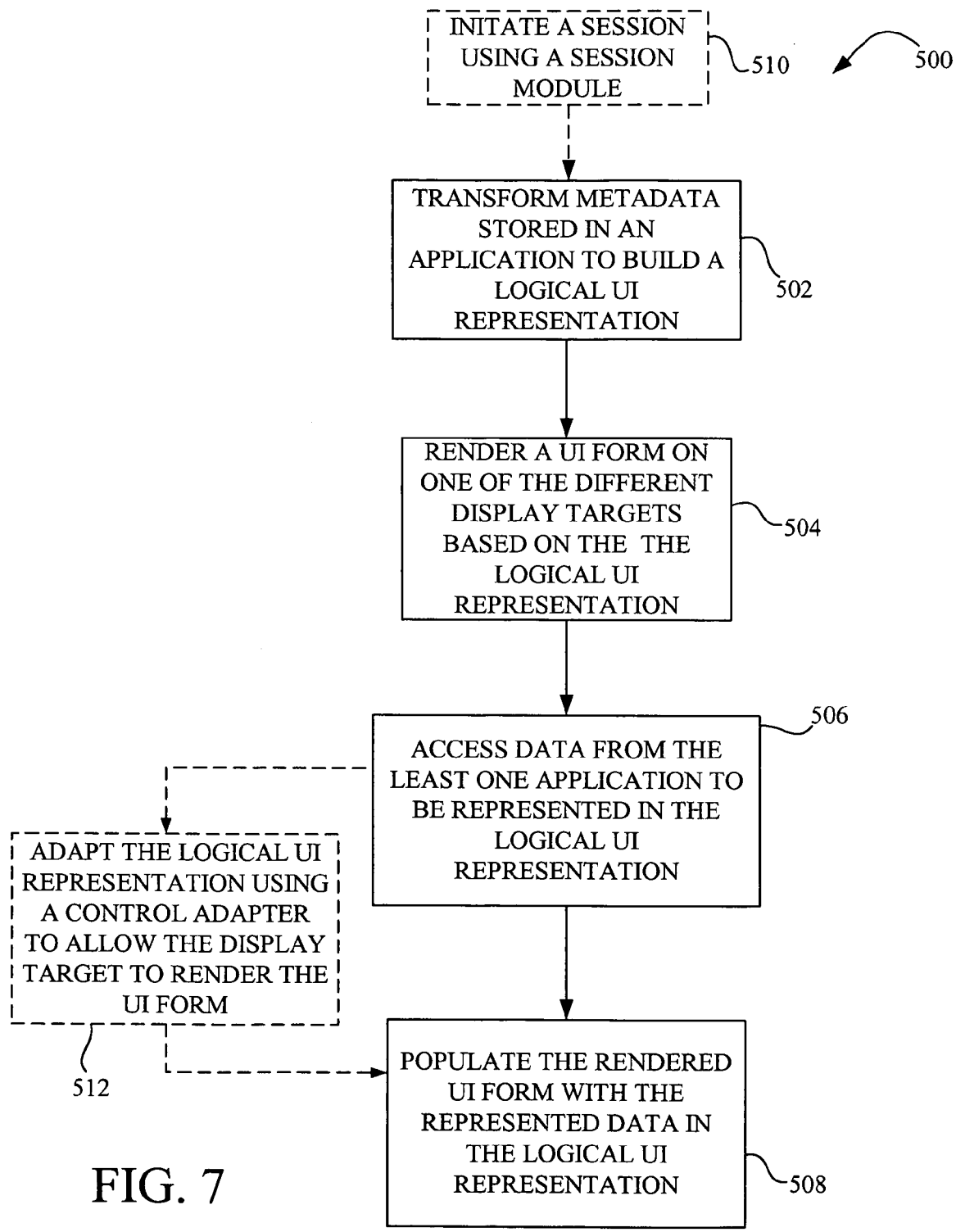
FIG. 7 illustrates a flowchart of a computer-implemented method of generating a UI form that can be rendered on different types of display targets.

FIG. 6 illustrates a more detailed block diagram of system 300 illustrated in FIGS. 3 and 4. System 300 can generate a UI form that can be rendered on different types of display targets 304 during run-time. FIG. 7 is a flowchart 500 illustrating a computer-implemented method of generating a UI form. Run-time is the act of building a logical UI representation 312, rendering a UI form in accordance with logical UI representation and then populating the UI form with data from the application. Referring to both FIGS. 6 and 7, at block 502 of FIG. 7, metadata stored in application 306-2 is transformed to build logical UI representation 312. FIGS. 4 and 5 illustrate and describe the building of logical UI representation 312 by creating at least one databinder module 322, creating actions module 324 and creating logical forms and controls module 326. At block 504, a UI form is rendered on one of the different display targets 306-3 based on logical UI representation 312. For example, UI form can be rendered as a Windows form if the display target is a conventional operating system on a personal computer. The UI form can be rendered as a web form if the display target is an Internet browser. The UI form can be rendered as a mobile device form if the display target is a personal digital assistant, cell phone or other type of mobile device. At block 506, data is accessed from the at least one application 304-2 to be represented in the logical UI representation 312. Data is represented in at least one databinder module 322 and in actions module 324 of logical UI representation 312. As illustrated by the arrows in FIG. 6, builder 308 uses metadata 316 from application 304-2 to build logical UI representation 312. Databinder module 322 accesses application data 330 from application 304-2 to be represented in data structures that is independent of the type of application 304-2. Actions module 324 accesses application logic 320 from application 304-2 to represent operations available to a user of display target 306-3 that is independent of the type of application 304-2. At block 508, the rendered UI form is populated with data represented in logical UI representation 312. This means data in actions module 324 and at least one databinder module 322 is used to populate the UI form that is rendered on display target 306-3. Therefore, a user can interact with this data and the UI form can be updated accordingly based on data accessed by both databinder module 322 and actions module 324. In general, triggering of action module 324 occurs upon a user indication to do so.

To build a logical UI representation 312 using a builder 308 to transform metadata, display target 306-3 first initiates a session using session module 310 as illustrated in block 510. A session of session module 310 is responsible for validating a user's credentials, instantiating a builder or builders and notifying display targets 306 when new UI forms are ready for rendering. Therefore, session module 310 raises an event for notification to a display target before a UI form is to be rendered onto a display target. In other words, session module 310 raises an event prior to step 504 being performed.

Prior to populating the rendered form with data in the logical UI representation 312, the controls of logical forms and controls module 326 can be first exposed to a control adapter 328 as indicated in block 512. Each type of display target 306 includes a control adapter 328. Each control adapter 328 adapts the controls of the logical UI representation 312 into controls in the display target 304 (i.e. native controls or controls native to the display target 304). In other words, control adapter 328 translates the logical UI representation 312 such that the native controls of the display target 304 can understand the content of logical UI representation 312 and populate data on a rendered UI form in accordance with the type of display target that control adapter 328 is adapting for.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method of constructing a logical user interface (UI) representation for use in rendering a user interface (UI) form, the computer-implemented method comprising:
   initiating a session to validate credentials of a user, instantiate a builder to transform metadata stored in at least one application to construct the logical UI representation and notify at least one display target when the UI form is ready to be rendered by raising an event, the builder configured to:
   create at least one databinder module having a plurality of databinders configured to represent application data from the at least one application, after the data is represented in the at least one databinder module the represented data are independent of the at least one application that the data originated from and are used to populate the UI form such that the user can interact with the represented data and the UI form can be updated accordingly;
   create an actions module having a plurality of actions configured to represent operations available to a user found in application logic of the at least one application, after the operations are represented in the created actions module the represented operations are independent of the at least one application that the operations originated from and are used to populate the UI form such that the user can interact with the represented operations and the UI form can be updated accordingly; and
   create a logical forms and controls module configured to represent an interface between the at least one display target and the at least one databinder module and the actions module, the logical controls and forms module handles user interaction with the at least one display target and is independent of a type of a display target where the UI form is rendered.

2. The computer-implemented method of claim 1, wherein the builder creates the at least one databinder module to access data from the at least one application to represent the data as a data structure independent of the type of application.

3. The computer-implemented method of claim 2, wherein the builder creates the actions module to access logic in the at least one application such that the action module includes operations available to a user for performing on the data structure represented by the databinding module.

4. The computer-implemented method of claim 2, wherein the builder creates a databinder module for each type of application to be accessed.

5. The computer-implemented method of claim 1, wherein builder creates the logical forms and control module for use in exposing content of the logical UI representation to the at least one display target.

6. A computer-implemented method of generating a user interface (UI) form that can be rendered on different types of display targets, the computer-implemented method comprising:
   initiating a session to validate credentials of a user, to instantiate a builder to transform metadata stored in at least one application to build a logical user interface (UI) representation and notify at least one display target when the UI form is ready to be rendered by raising an event, the logical UI representation including a first portion in communication with the different types of display targets and a second portion in communication with the at least one application, the second portion configured to represent application data from the at least one application, after the data is represented in the second portion the represented data are independent of the at least one application;
   rendering a UI form on at least one of the different types of display targets based on the logical UI representation using the first portion of the logical UI representation;
   accessing data represented in the logical UI representation from the second portion of the logical UI representation; and
   populating the rendered UI form using the represented data in the second portion of the logical UI representation to provide content for the rendered UI form such that the user can interact with the represented data and the UI form can be updated accordingly.

7. The computer-implemented method of claim 6, wherein, transforming metadata stored in the at least one application to build a logical UI representation comprises creating at least one databinder module having a plurality of databinders configured to represent the data, the databinder module being apart of the second portion of the logical UI representation.

8. The computer-implemented method of claim 7, wherein the at least one databinder module is dependent on a type of the at least one application.

9. The computer-implemented method of claim 7, wherein transforming metadata stored in the at least one application to build the logical UI representation comprises creating an actions module configured to represent operations available to a user of the at least one display target for performing on the represented data, the actions module being apart of the second portion of the logical UI representation.

10. The computer-implemented method of claim 9, wherein the actions module is dependent on a type of the at least one application.

11. The computer-implemented method of claim 9, wherein transforming metadata stored in the at least one application to build the logical UI representation comprises creating a logical forms and controls module configured to represent an interface between the at least one display target and the at least one databinder module and the actions module, the logical forms and controls module being apart of the first portion of the logical UI representation.

12. The computer-implemented method of claim 11, wherein building the logical forms and controls module comprises configuring the logical forms and controls module to handle user interaction from the at least one display target.

13. The computer-implemented method of claim 12, wherein the logical forms and controls module is independent of the different types of display targets.

14. The computer-implemented method of claim 6, further comprising adapting controls of the logical UI representation into controls of the display target using a control adapter.

15. A system for generating a user interface (UI) form, the system comprising:
a display target;
a computer storage medium configured to store at least one application including an application source and metadata, wherein the application source includes application data;
a logical client configured to build a logical user interface (UI) representation from the metadata stored in the at least one application upon the display target initiating a session with the logical client to validate credentials of a user, to instantiate a builder to transform the metadata stored in at least one application to construct the logical UI representation and notify at least one display target when the UI form is ready to be rendered by raising an event, the logical UI representation configured to represent the application data from the at least one application, after the data is represented in the second portion the represented data are independent of the at least one application; and
wherein the at least one display target is configured to render the UI form based on the logical UI representation and to populate the rendered UI form using the represented data such that the user can interact with the represented data and the UI form can be updated accordingly.

16. The system of claim 15, further comprising a control adapter that is configured to adapt the logical UI representation such that the at least one display target can populate data into the rendered UI form.

17. The system of claim 15, wherein the at least one application comprises a business application.

18. The system of claim 15, wherein the logical UI representation comprises at least one databinder module, an actions module and a logical forms and controls module.

* * * * *